US009708452B2

(12) United States Patent
Lee et al.

(10) Patent No.: US 9,708,452 B2
(45) Date of Patent: Jul. 18, 2017

(54) METHOD OF PREPARING SUPERABSORBENT POLYMER

(71) Applicant: LG CHEM, LTD., Seoul (KR)

(72) Inventors: Sang Gi Lee, Daejeon (KR); Sung Soo Park, Daejeon (KR); Chul Hee Ryu, Daejeon (KR); Tae Young Won, Daejeon (KR)

(73) Assignee: LG CHEM, LTD., Seoul (KR)

( * ) Notice: Subject to any disclaimer, the term of this patent is extended or adjusted under 35 U.S.C. 154(b) by 349 days.

(21) Appl. No.: 14/390,303

(22) PCT Filed: May 9, 2014

(86) PCT No.: PCT/KR2014/004166
§ 371 (c)(1),
(2) Date: Oct. 2, 2014

(87) PCT Pub. No.: WO2014/182128
PCT Pub. Date: Nov. 13, 2014

(65) Prior Publication Data
US 2016/0280866 A1    Sep. 29, 2016

(30) Foreign Application Priority Data

May 9, 2013   (KR) .................. 10-2013-0052700
May 8, 2014   (KR) .................. 10-2014-0054990

(51) Int. Cl.
*C08F 2/46*   (2006.01)
*C08F 2/50*   (2006.01)
*C08G 61/04*   (2006.01)
*C08J 3/24*   (2006.01)
*C08J 3/12*   (2006.01)
*C08J 3/28*   (2006.01)

(52) U.S. Cl.
CPC ............. *C08J 3/245* (2013.01); *C08J 3/122* (2013.01); *C08J 3/28* (2013.01); *C08J 2333/02* (2013.01)

(58) Field of Classification Search
CPC ..... C08J 3/245; C08J 3/122; C08J 3/28; C08J 2333/20; A61L 15/24; A61L 15/60
USPC ................. 522/64, 6, 71, 1, 189, 184; 520/1
See application file for complete search history.

(56) References Cited

U.S. PATENT DOCUMENTS

| 4,043,952 | A | 8/1977 | Ganslaw et al. |
| 5,728,742 | A * | 3/1998 | Staples .................. A61L 15/20 427/222 |
| 7,179,851 | B2 | 2/2007 | Qin et al. |
| 8,252,873 | B1 | 8/2012 | Gartner et al. |
| 2003/0207997 | A1* | 11/2003 | Mertens .................. A61L 15/48 525/244 |
| 2009/0299315 | A1 | 12/2009 | Flohr et al. |
| 2012/0035294 | A1* | 2/2012 | Kim .......................... C08F 2/48 522/154 |
| 2014/0051813 | A1* | 2/2014 | Won ......................... C08J 3/245 525/384 |
| 2014/0058048 | A1* | 2/2014 | Won ......................... B01J 20/267 525/384 |

FOREIGN PATENT DOCUMENTS

| EP | 0555692 A1 | 8/1993 |
| JP | 56161408 A | 12/1981 |
| JP | 57158209 A | 9/1982 |
| JP | 57198714 A | 12/1982 |
| JP | 644063 B2 | 1/1989 |
| JP | 2003534407 A | 11/2003 |
| JP | 2004250689 A | 9/2004 |
| JP | 2008303319 A | 12/2008 |
| JP | 2011252080 A | 12/2011 |
| JP | 2012031217 A | 2/2012 |
| JP | 2012126796 A | 7/2012 |
| JP | 2012207139 A | 10/2012 |
| KR | 10-2006-0087615 A | 8/2006 |
| KR | 1020070032299 A | 3/2007 |
| KR | 1020070037423 A | 4/2007 |
| KR | 1020100083147 A | 7/2010 |
| KR | 1020110003258 A | 1/2011 |
| KR | 1020110006771 A | 1/2011 |
| KR | 1020110049072 A | 5/2011 |
| KR | 1020110050947 A | 5/2011 |
| KR | 1020120049004 A | 5/2012 |
| KR | 1020120054836 A | 5/2012 |

(Continued)

OTHER PUBLICATIONS

Herfert et al, WO 2004-020008 Machine translation, Apr. 11, 2004.*
Graham et al, Commercial Processes for the manufacture of Superabsorbent polymers, Modern superabsorbent polymer technology, pp. 69-73 and 97-103.*
ILCO Ionic Lube—Catalogue of Ionic liquids, ILCO Chemikalien, 2008.
A. Graham, et al., "Commercial Processes for the Manufacture of Superabsorbent Polymers", Modern Superabsorbent Polymer Technology, WILEY-VCH, 1998 John Wiley & Sons, Inc.

(Continued)

*Primary Examiner* — Jessica E Whiteley
(74) *Attorney, Agent, or Firm* — Dentons US LLP

(57) ABSTRACT

This disclosure relates to a method for preparing superabsorbent polymer. The method for preparing superabsorbent polymer according to one aspect of the invention comprises obtaining hydrogel polymer during the process of preparing superabsorbent polymer, and then, spraying a surface crosslinking solution comprising a surface crosslinker, alcohol, and ionic liquid to crosslink the surface of the pulverized polymer. The method for preparing superabsorbent polymer may use ionic liquid without using lower alcohol, or if lower alcohol is used together, may minimize the amount, and thus, reduce cost and additional drying treatment, and may control swelling of gel to prepare superabsorbent polymer with excellent product properties.

9 Claims, No Drawings

(56) References Cited

FOREIGN PATENT DOCUMENTS

| KR | 1020120059169 | A | | 6/2012 |
|---|---|---|---|---|
| WO | 00/53664 | A1 | | 9/2000 |
| WO | 02/100451 | A2 | | 12/2002 |
| WO | 2004020008 | | * | 4/2004 |
| WO | 2004/096304 | A1 | | 11/2004 |
| WO | 2009/080611 | A2 | | 7/2009 |
| WO | 2009-134694 | A2 | | 11/2009 |

OTHER PUBLICATIONS

Extended European Search Report dated Nov. 23, 2015 in European Patent Application No. 14772050.2 (16 pages).
George Odian, "Principles of Polymerization", Wiley Interscience, 1981, p. 203.
Reinhold Schwalm, "UV Coatings—Basics, Recent Developments and New Applications", Elsevier Science, Dec. 21, 2006, p. 115.

* cited by examiner

METHOD OF PREPARING SUPERABSORBENT POLYMER

This application is a National Stage Entry of International Application No. PCT/KR2014/004166, filed May 9, 2014, and claims the benefit of Korean Application No. 10-2013-0052700, filed on May 9, 2013, and Korean Application No. 10-2014-0054990, filed May 8, 2014, all of which are hereby incorporated by reference in their entirety for all purposes as if fully set forth herein.

TECHNICAL FIELD

The present invention relates to a method for preparing superabsorbent polymer.

BACKGROUND ART

Super absorbent polymer (SAP) is synthetic polymer material that can absorb moisture of 500 to 1000 times of self-weight, and is differently named according to development companies such as super absorbency material (SAM), absorbent gel material (AGM), and the like. The superabsorbent polymer began to be commercialized as sanitary items, and currently, it is being widely used as hygienic goods such as a disposable diaper and the like, water-holding material for soil, water stop material for civil engineering and architecture, sheets for raising seedling, freshness preservatives in the field of food circulation, and formentation material, and the like.

As a method for preparing the superabsorbent polymer, a reverse phase suspension polymerization method or an aqueous polymerization method, and the like are known. The reverse phase suspension polymerization method is disclosed in, for example, Japanese Patent Laid-Open Publication No. Sho 56-161408, Japanese Patent Laid-Open Publication No. 57-158209, and Japanese Patent Laid-Open Publication No. 57-198714, and the like. As the aqueous polymerization method, a thermal polymerization method wherein hydrogel polymer is polymerized while breaking and cooling in a kneader equipped with several shafts, and a photopolymerization method wherein an aqueous solution of high concentration is simultaneously polymerized and dried by irradiating UV on a belt, and the like are known.

Meanwhile, the hydrogel polymer obtained by the polymerization reaction is generally dried and pulverized, and then, the surface of the polymer is selectively crosslinked so as to have desired absorption capacity and pressure absorption capacity. The selective crosslinking requires controlling of the penetration depth of a surface crosslinker, and for this, it is general that the penetration depth of a surface crosslinker is controlled using alcohol and water. However, if the penetration depth of a crosslinker is controlled using alcohol, there are disadvantages in that it is unfavorable in terms of the cost because a large amount of alcohol is consumed, and additional drying treatment is required.

Accordingly, to overcome these problems, methods of minimizing the use amount of alcohol or using no alcohol have been suggested in the prior art. However, there was a problem in that in case the use amount of alcohol is too lowered, water may be excessively absorbed in the polymer, thus making effective crosslinking difficult due to the agglomeration of gel.

DOCUMENTS OF RELATED ART

Patent Documents (Patent Document 1) 1. Japanese Patent Laid-Open Publication No. Sho 56-161408

(Patent Document 2) 2. Japanese Patent Laid-Open Publication No. Sho 57-158209

(Patent Document 3) 3. Japanese Patent Laid-Open Publication No. Sho 57-198714

SUMMARY OF THE INVENTION

Technical Problem

It is an object of the present invention to provide a method for preparing superabsorbent polymer that may further improve product properties compared to the existing products by uniformly dispersing a surface crosslinking solution including ingredients capable of controlling absorption degree of water and controlling penetration depth of a surface crosslinker by the similar principle to alcohol on the surface of hydrogel polymer and conducting surface crosslinking, thus controlling swelling of gel.

Technical Solution

The method for preparing superabsorbent polymer according to one aspect of the invention comprises thermally polymerizing or photopolymerizing a monomer composition comprising water-soluble ethylene unsaturated monomers and a polymerization initiator to form hydrogel polymer;

drying the hydrogel polymer;

pulverizing the dried polymer; and spraying a surface crosslinking solution comprising a surface crosslinker, water and ionic liquid to the pulverized polymer to crosslink the surface of the pulverized polymer, wherein the ionic liquid is used in the amount of 0.05 to 1.0 parts by weight, based on 100 parts by weight of the pulverized polymer.

The ionic liquid may consist of cations and anions, and may be neutral.

And, the cation may be selected from the group consisting of imidazole, pyridine, pyrazole, thiazole, isothiazole, azathiazole, oxothiazole, oxaine, oxazoline, oxazoborole, dithiozole, triazole, selenozole, oxaphosphole, pyrrole, borole, furan, thiophene, phosphole, pentazole, indole, indoline, oxazole, isoxazole, isotriazole, tetrazole, benzofuran, dibenzofuran, benzothiophene, dibenzothiophene, thiadiazole, pyrimidine, pyrazine, pyridazine, piperazine, piperidine, morpholene, pyrane, anoline, phthalazine, quinazoline, quinoxaline, quinoline, isoquinoline, tazine, oxazine, aza annulene, alkali metal, alkali earth metal, and transition metal cations.

And, the cation may be selected from the group consisting of N-alkylpyridinium, and N,N-dialkylimidazolium.

Furthermore, the alkyl may be an alkyl group having a carbon number of 1 to 4.

And, the anion may be selected from the group consisting of anions constituting chloride salt, borate, nitrate, sulfate, triflate, halogenated copper salt, antimonite, carborane, polyoxometallate, metal borane, and carboxylate.

And, the anion may be selected from the group consisting of $Cl^-$, $BF_4^-$, $PF_6^-$, $CF_3SO_3^-$, $CF_3COO^-$, $SbF_6^-$, $[CuCl_2]^-$, $AsF_6^-$, $SO_4^-$, $CF_3CH_2CH_2COO^-$, $(CF_3SO_2)C^-$, $CF_3(CF_2)_3SO_3^-$, and $[CF_3SO_2]_2N^-$.

The ionic liquid may include acidic ionic liquid prepared from a salt wherein anion of carboxylic acid is bonded.

And, the surface crosslinker may be at least one selected from the group consisting of a polyhydric alcohol compound; an epoxy compound; a polyamine compound; a haloepoxy compound; condensate of a haloepoxy compound; an oxazoline compound; a mono-, di-, or polyoxazolidinone compound; a cyclic urea compound; a multivalent metal salt; and an alkylene carbonate compound.

Wherein, the surface crosslinker may be added in the amount of 0.1 to 2.0 parts by weight, based on 100 parts by weight of the pulverized polymer.

The surface crosslinking solution may further include monohydric lower alcohol, and the lower alcohol may be added in the amount of 0.1 to 2.0 parts by weight, based on 100 parts by weight of the pulverized polymer.

The moisture content of the thermally polymerized or photopolymerized hydrogel polymer may be 40 to 80 wt %.

And, the moisture content of the dried polymer may be 0.1 to 10 wt %.

And, the pulverization of the dried polymer may be progressed such that the pulverized polymer may have weight average particle diameter of 150 to 850 μm.

And, the surface crosslinking may be progressed at 100 to 250° C. for 1 to 120 minutes.

Advantageous Effects

The method for preparing superabsorbent polymer according to the present invention may control the penetration depth of a crosslinker using ionic liquid instead of the existing monohydric alcohol in a surface crosslinking solution, and may prepare superabsorbent polymer with excellent physical properties through uniform surface crosslinking.

DETAILED DESCRIPTION OF THE INVENTION

Although various modifications can be made to the present invention and the present invention may have various examples, specific examples will be illustrated in the drawings and explained in detail. However, it is to be understood that the present invention is not limited to the specific examples, and includes all the modifications, equivalents or substitutes within the scope of the idea and technology of the present invention. In case it is judged that concrete explanations of related known technologies may obscure the subject matter of the invention, detailed explanations thereof will be omitted.

According to one embodiment of the invention, provided is a method for preparing superabsorbent polymer comprising thermally polymerizing or photopolymerizing a monomer composition comprising water-soluble ethylene unsaturated monomers and a polymerization initiator to form hydrogel polymer; drying the hydrogel polymer; pulverizing the dried polymer; and spraying a surface crosslinking solution comprising a surface crosslinker, water and ionic liquid to the pulverized polymer to crosslink the surface of the pulverized polymer, wherein the ionic liquid is used in the amount of 0.05 to 1.0 parts by weight, based on 100 parts by weight of the pulverized polymer.

In the prior art, since alcohol and water were commonly used to control the penetration depth of a surface crosslinker in the crosslinking step, it was difficult to reduce the use amount of alcohol. However, in the method for preparing superabsorbent polymer according to the present invention, ionic liquid is additionally used instead of the existing monohydric alcohol in a surface crosslinking solution, and thus, monohydric alcohol such as methanol and the like is not used or the use amount is reduced to very small amount, thereby preventing excessive absorption of water in the polymer, obtaining cost reduction effect, and controlling the swelling of gel by the absorption of water, to improve physical properties of the superabsorbent polymer.

Hereinafter, the method for preparing superabsorbent polymer according to the embodiments of the invention will be explained in detail.

First, in the method for preparing superabsorbent polymer according to one embodiment of the invention, the preparation of hydrogel polymer by polymerization of a monomer composition, polymerization conditions, and drying and pulverizing processes of hydrogel polymer may be progressed as described below, except the composition of a surface crosslinking solution. The hydrogel polymer may refer to primarily classified base resin.

Now, the composition of the surface crosslinking solution, which is the characteristic of the invention, will be explained.

The present invention uses a surface crosslinking solution for surface crosslinking of pulverized polymer, wherein the surface crosslinking solution comprises a surface crosslinker, water and ionic liquid.

When the surface crosslinker is added, unlike the existing method of using alcohol, ionic liquid may be additionally mixed and added together. In case ionic liquid is added, the ionicity of the solution may be increased to control the surface crosslinking penetration depth of the crosslinker. Namely, as explained above, by adding ionic liquid instead of monohydric alcohol such as methanol which was previously included in the surface crosslinking solution, the control of swelling of hydrogel by the absorption of water may be facilitated compared to the case of adding water. The monohydric alcohol does not participate in the surface crosslinking reaction.

The ionic liquid used in the present invention generally refers to strongly ionic liquid consisting of inorganic cation and anion and having neutrality. And, the ionic liquid used in the present invention refers to substance that has the shape of ionic solid or liquid, but is in a liquid state at room temperature, for example, at 15 to 40° C., and it may replace alcohol that is mainly used in the existing surface crosslinking solution to control the swelling of gel by the absorption of water.

It is preferable to use ionic material dissolved in a solvent, preferably water as the ionic liquid, which aids in effectively treating the surface of hydrogel compared to the case of simply adding water. The ionic liquid may be prepared to the concentration of 0 to 10 wt %.

And, the ionic liquid may be added in the amount of 0.05 to 1.0 parts by weight, based on 100 parts by weight of the pulverized polymer. If the ionic liquid is added in the amount of less than 0.05 parts by weight, there may be no difference from the case of adding pure water, and if it is added in the amount of greater than 1.0 part by weight, there may be a problem in terms of economical feasibility, and thus, the above range is preferable.

And, in the ionic liquid, the cation may be selected from the group consisting of imidazole, pyridine, pyrazole, thiazole, isothiazole, azathiazole, oxothiazole, oxaine, oxazoline, oxazoborole, dithiozole, triazole, selenozole, oxaphosphole, pyrrole, borole, furan, thiophene, phosphole, pentazole, indole, indoline, oxazole, isoxazole, isotriazole, tetrazole, benzofuran, dibenzofuran, benzothiophene, dibenzothiophene, thiadiazole, pyrimidine, pyrazine, pyridazine, piperazine, piperidine, morpholene, pyrane, anoline, phthalazine, quinazoline, quinoxaline, quinoline, isoquinoline, tazine, oxazine, aza annulene, alkali metal, alkali earth metal, and transition metal cations.

Among the cations, pyridinum or imidazolium cation may be preferably used, and more preferably, the cation may be selected from the group consisting of N-alkylpyridinium and N,N-dialkylimidazolium cations. The alkyl in the N-alkylpyridinium and N,N-dialkylimidazolium cations may prevent viscosity increase, and in order to prevent yield decrease due to the increase in side reaction, it may be preferably a methyl, an ethyl, a propyl, or a butyl group.

Most preferably, the ionic liquid may be a compound including imidazolium cation of the following Chemical Formula 1.

[Chemical Formula 1]

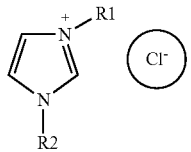

(wherein, R1 and R2 are independently an organic substituent, and a linear or branched alkyl group having a carbon number of 1 to 20).

Meanwhile, as the anion, those constituting salts including the atoms of Groups IB, IIIA, IVA, VA, VIA, and VIIA of the periodic table, or a carboxy group or halogenated salt, and the like may be used. Specifically, the anion may be selected from the group consisting of anions constituting chloride salt, borate, nitrate, sulfate, triflate, halogenated copper salt, antimonite, carborane, polyoxometallate, metal borane, and carboxylate, and preferably, it may be selected from the group consisting of $Cl^-$, $BF_4^-$, $PF_6^-$, $CF_3SO_3^-$, $CF_3COO^-$, $SbF_6^-$, $[CuCl_2]^-$, $AsF_6^-$, $SO_4^-$, $CF_3CH_2CH_2COO^-$, $(CF_3SO_2)C^-$, $CF_3(CF_2)_3SO_3^-$, and $[CF_3SO_2]_2N^-$. More preferably, it may be $Cl^-$, $BF_4^-$ or $PF_6^-$.

The ionic liquid may be used as it is, or it may be used as acidic ionic liquid. The cation of the acidic ionic liquid may be selected from the group consisting of the above explained cations, but preferably, the anion has a carboxy group.

The ionic liquid may include acidic ionic liquid prepared from a salt including cation of alkali metal or alkali earth metal, and anion of carboxylic acid bonded thereto through a separate process. Namely, the acidic ionic liquid may be prepared by reacting imidazolium chloride with sodium acetate to produce sodium chloride and then separating it, for example. The carboxylic acid may include formic acid, acetic acid, propionic acid, butyric acid, isobutyric acid, acrylic acid, methacrylic acid, hexoic acid, or 2-ethylhexoic acid, and the like.

Meanwhile, in the present invention, in order to progress a surface crosslinking reaction of the pulverized hydrogel polymer powder, a surface crosslinker may be added to the surface crosslinking solution. The surface crosslinker that can be used is not specifically limited as long as it is a compound capable of reacting with the functional group of the polymer.

In order to improve the properties of the superabsorbent polymer prepared by the method for preparing superabsorbent polymer according to one embodiment of the invention, the surface crosslinker may be at least one selected from the group consisting of a polyhydric alcohol compound; an epoxy compound; a polyamine compound; a haloepoxy compound; condensate of a haloepoxy compound; an oxazoline compound; a mono-, di-, or polyoxazolidinone compound; a cyclic urea compound; a multivalent metal salt; and an alkylene carbonate compound.

Specifically, the polyhydric alcohol compound may include at least one selected from the group consisting of mono-, di-, tri-, tetra- or polyethyleneglycol, monopropyleneglycol, 1,3-propanediol, dipropyleneglycol, 2,3,4-trimethyl-1,3-pentanediol, polypropyleneglycol, glycerol, polyglycerol, 2-butene-1,4-diol, 1,4-butanediol, 1,3-butanediol, 1,5-pentanediol, 1,6-hexanediol, and 1,2-cyclohexanedimethanol.

And, the epoxy compound may include at least one selected from the group consisting of ethyleneglycoldiglycidylether and glycidol and the like, and the polyamine compound may at least one selected from the group consisting of ethylenediamine, diethylenetriamine, triethylenetetraamine, tetraethylenepentamine, pentaethylenehexamine, polyethyleneimine, and polyamidepolyamine.

And, the haloepoxy compound may include epichlorohydrin, epibromohydrin, and α-methylepichlorohydrin, and the mono-, di- or polyoxazolidinone compound may include for example 2-oxazolidinone, and the like.

And, the alkylencarbonate compound may include ethylenecarbonate and the like. And, these compounds may be used alone or in combinations.

And, the content of the surface crosslinker that is added to surface-treat polymer particles may be appropriately selected according to the kind of added surface crosslinkers or reaction conditions, but preferably, it may be added in the amount of 0.1 to 2.0 parts by weight, based on 100 parts by weight of the polymer.

If the content of the surface crosslinker is too low, a surface crosslinking reaction hardly occurs, and if it is greater than 2.0 parts by weight based on 100 parts by weight of the polymer, absorption capacity and physical properties may be lowered due to the progression of excessive surface crosslinking reactions.

The method of adding the surface crosslinker to the polymer is not specifically limited. And, a method of introducing the surface crosslinker and polymer powder in a reactor and mixing them, a method of spraying the surface crosslinker to polymer powder, or a method of continuously supplying polymer and the crosslinker to a continuously operated mixer and mixing them, and the like may be used.

Meanwhile, water is used as a solvent in order to control the penetration depth of the surface crosslinker, but other solvents may be added, and the kind of the solvents is not specifically limited. The content of water included in the surface crosslinker is not limited, and the content well known in the art may be used.

And, the present invention may further use monohydric lower alcohol in the surface crosslinking solution.

The lower alcohol may be added in the amount of 0.1 to 2.0 parts by weight, based on 100 parts by weight of the pulverized polymer. If the lower alcohol is used in the amount of less than 0.1 parts by weight, there may be no difference from the case of adding pure water, and if it is added in the amount greater than 2.0 parts by weight, there may be a problem in terms of economical feasibility.

In the prior art, in case water and alcohol are used, water and alcohol were used respectively in the amount of 4 parts by weight, based on 100 parts by weight of the pulverized polymer. However, according to the present invention, alcohol is not used or very small amount of alcohol may be used.

And, if necessary, the surface crosslinking solution may further comprise at least one solvent selected from the group consisting of ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide. The use amount of the solvent may be equivalent to the use amount of the monohydric lower alcohol, or commonly used content in the art may be used.

Meanwhile, in the method according to the above explained embodiment, the polymer may be prepared by the steps and methods commonly used in the art to prepare superabsorbent polymer.

Specifically, as the water-soluble ethylene unsaturated monomer, those commonly used for the preparation of superabsorbent polymer may be used without specific limitations, and at least one selected from the group consisting of anionic monomer and a salt thereof, nonionic hydrophilic monomer, amino group-containing unsaturated monomer and a quaternarized product thereof may be used.

Specifically, at least one selected from the group consisting of anionic monomer such as acrylic acid, methacrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and a salt thereof; nonionic hydrophilic monomer such as (meth) acrylamide, N-substituted (meth)acrylate, 2-hydroxyethyl (meth)acrylate, 2-hydroxypropyl(meth)acrylate, methoxypolyethyleneglycol(meth)acrylate, 2-hydroxypropyl(meth) acrylate, methoxypolyethyleneglycol(meth)acrylate, or polyethyleneglycol(meth)acrylate; and amino group-containing unsaturated monomer such as (N,N)-dimethlaminoethyl(meth)acrylate or (N,N)-dimethylaminopropyl(meth) acrylamide, and a quartenarized product thereof may be preferably used.

More preferably, acrylic acid or a salt thereof may be used, and in this case, superabsorbent polymer with improved absorption property may be obtained.

And, in the method according to the above explained embodiment, the monomer composition comprises a polymerization initiator, and it may comprise a photopolymerization initiator when it is subjected to photopolymerization or a thermal polymerization initiator when it is subjected to thermal polymerization. However, even when the monomer composition is subjected to photopolymerization, a fixed amount of heat is generated by irradiation such as UV irradiation, and heat is generated to some degree according to the progression of the polymerization reaction, which is an exotheric reaction, and thus, it may further comprise a thermal polymerization initiator.

Specifically, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2 S_2O_8$), and the like, and specific examples of the azo initiator may include 2,2-azobis(2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl)propane]dihydrochloride, 4,4-azobis-(4-cyanovalericacid), and the like. More various thermal initiators are described clearly in "Principle of Polymerization (Wiley, 1981)", Odian, p203, and are not limited to the above explained examples.

As the photopolymerization initiator, at least one selected from the group consisting of benzoinether, dialkylacetophenone, hydroxylalkylketone, phenylglyoxylate, benzyldimethylketal, acylphosphine, and α-aminoketone may be used. Specific examples of the acylphosphine may include commercially available lucirin TPO, i.e., 2,4,6-trimethyl-benzoyl-trimethylphosphineoxide. More various photoinitiators are described clearly in "UV Coatings: Basics, Recent Developments and New Application (Elsevier, 2007)", Reinhold Schwalm, p115, and are not limited to the above explained examples.

Meanwhile, as the method for thermally polymerizing or photopolymerizing the monomer composition to prepare hydrogel polymer, commonly used polymerization methods may be used without specific limitations. Specifically, the polymerization method is largely classified into thermal polymerization and photopolymerization according to polymerization energy source, and in case thermal polymerization is progressed, it may be commonly progressed in a reactor equipped with an agitation shaft such as kneader, and in case photopolymerization is progressed, it may be commonly progressed in a reactor equipped with a movable conveyer belt, but the polymerization method is not limited thereto.

For example, hydrogel polymer obtained by supplying hot air to a reactor such as a kneader equipped with an agitation shaft as explained above or heating the reactor to conduct thermal polymerization may have a size of a few centimeter to a few millimeter according to the shape of the agitation shaft. Specifically, the size of the obtained hydrogel polymer may be varied according to the concentration and feed speed of the monomer composition, and the like, and commonly, hydrogel polymer having particle size of 2 to 50 mm may be obtained.

Meanwhile, the thermally polymerized or photopolymerized hydrogel polymer may have a moisture content of 40 to 80 wt %. As used herein, the term "moisture content" refers to a value obtained by subtracting the weight of polymer of a dried state from the total weight of hydrogel polymer. Specifically, it is defined by a value calculated by measuring weight decrease according to the evaporation of moisture in the polymer during a process of raising the temperature of the polymer and drying by infrared heating. Wherein, the temperature is raised from room temperature to 180° C. and then maintained at 180° C., and the total drying time is set as 20 minutes including 5 minutes of the temperature raising step.

And, the obtained hydrogel polymer is subjected to a drying step, and if necessary, a simple pulverization step may be further conducted before drying in order to increase the efficiency of the drying step.

The pulverized hydrogel polymer or hydrogel polymer immediately after polymerized is subjected to a drying step, wherein the drying temperature may be 150° C. to 250° C. As used herein, the term "drying temperature" may be defined as the temperature of heating medium supplied for drying or the temperature of a dryer including heating medium and polymer in the drying process.

If the drying temperature is less than 150° C., the drying time may be too lengthened, and the physical properties of the finally formed superabsorbent polymer may be lowered, and if it is greater than 250° C., only the surface of the polymer may be excessively dried, fine particles may be generated in the subsequent pulverization process, and the physical properties of the finally formed superabsorbent polymer may be lowered. Preferably, the drying may be progressed at a temperature of 150° C. to 200° C., more preferably at a temperature of 160° C. to 180° C.

Meanwhile, the drying time is not specifically limited, but it may be progressed for 20 to 90 minutes considering the process efficiency and the like.

And, as the drying method, any methods commonly used for drying of hydrogel polymer may be selected and used without specific limitations. Specifically, the drying step may be progressed by hot air supplying, infrared irradiation, microwave irradiation, or UV irradiation, and the like. After progressing the drying step, the moisture content of the polymer may be 0.1 to 10 wt %.

The dried polymer obtained through the drying step is subjected to a pulverization step.

The polymer powder obtained after the final pulverization step may have weight average particle diameter of 150 to 850 μm. As a pulverizer used for pulverization to the weight average particle diameter, a pin mill, a hammer mill, a screw mill, a roll mill, a disc mill, or a jog mill, and the like may be used, but not limited thereto.

Finally, a surface crosslinking step is conducted using a surface crosslinking solution to which the ionic liquid is added, wherein the surface crosslinking may be progressed at 100 to 250° C. for 1 to 120 minutes.

Wherein, the temperature elevating means for the surface crosslinking reaction are not specifically limited, and a heating medium may be supplied or a heat source may be directly supplied to heat. The heating medium that can be used may include fluid with elevated temperature such as steam, hot air, or hot oil, but is not limited thereto, and the temperature of supplied heating medium may be appropriately selected considering the means of the heating medium, temperature elevating speed and target temperature, and the like. And, the directly supplied heat source may include electricity heating, gas heating, and the like, but is not limited thereto.

Meanwhile, as used herein, the term "surface crosslinking reaction temperature" may be defined as a mean temperature of reactants including polymer and a surface crosslinker, included in "an effective volume of a reactor" for the crosslinking reaction, when 70 to 90% of the total surface crosslinking reaction time has elapsed.

And, as used herein, the term "an effective volume of a reactor" or "a volume of a reactor" is defined as the total volume of reactants included in the volume of the reactor.

The temperature of the surface crosslinking reaction may be preferably 100 to 250° C., and after temperature elevation for crosslinking, the crosslinking may be progressed for 1 to 120 minutes, preferably 1 to 60 minutes, most preferably 10 to 50 minutes.

If the crosslinking reaction time is less than 1 minute, a sufficient crosslinking reaction may not occur, and if it is greater than 120 minutes, due to excessive surface crosslinking, the polymer particles may be damaged to lower physical properties.

Hereinafter, the present invention will be explained in detail with reference to specific examples of the invention. However, these examples are only to illustrate the invention, and the right scope of the invention is not limited thereto.

Preparation Example

Preparation of Base Resin (1) Base Resin 1 (Hereinafter, Referred to as BR-1)

Into a 2 L glass reactor surrounded by a jacket in which heating medium precooled to 25° C. is circulated, a solution (A solution) including 500 g of acrylic acid, 11 g of 1% IRGACURE 819 initiator diluted in acrylic acid, and 34 g of diluted 5% polyethyleneglycol diacrylate (PEGDA, molecular weight 400) was injected, and 800 g of a 24% caustic soda solution (B solution) was slowly added dropwise and mixed.

It was confirmed that the temperature of the mixed solution increased to 80° C. or more by polymerization heat when the two solutions were mixed, and then, it was waited until the temperature was cooled to 40° C., and when the reaction temperature reached 40° C., 54 g of a diluted 2% sodium persulfate solution was injected.

The solution was poured into a Vat shaped tray (15 cm×15 cm) installed in a square polymerization reactor that is equipped with a light irradiation apparatus on the top and is preheated to 80° C. inside, and light irradiation was conducted to photoinitiate polymerization. It was confirmed that gel was generated from the surface about 24 seconds after light irradiation, and that a polymerization reaction occurred simultaneously with foaming about 50 seconds after light irradiation. Thereafter, the reaction was additionally conducted for 3 minutes, and then, the polymerized sheet was taken out, cut to a size of 3×3 cm, and chopped using a Meat chopper to prepare a crumb.

The crumb was dried in an oven in which wind volume may be transferred up and down. Hot air of 180° C. was flowed from the lower part to the upper part for 15 minutes and from the upper part to the lower part for 15 minutes to allow uniform drying, so that the moisture content of the dried product became 2% or less.

The dried product was pulverized with a pulverizer, and then, classified, and sizes of 150 to 850 μm were selected to prepare base resin. The prepared base resin had moisture retention capacity of 39.2 g/g, and water-soluble content of 14.1 wt %.

(2) Base Resin 2 (Hereinafter, Referred to as BR-2)

Into a 2 L glass reactor surrounded by a jacket in which heating medium precooled to 60° C. is circulated, a solution (A solution) including 450 g of acrylic acid and 12 g of 10% tetraethyleneglycoldiacrylate (TEGDA) diluted in acrylic acid was injected, and 750 g of a 25% caustic soda solution (B solution) was slowly added dropwise and mixed.

It was confirmed that the temperature of the mixed solution increased to 80° C. or more by polymerization heat when the two solutions were mixed, and then, it was waited until the temperature was cooled to 80° C., and when the reaction temperature reached 80° C., 22.5 g of a 10% sodium persulfate solution diluted in water was injected.

After sodium persulfate was injected and the mixture was agitated for a few seconds, it was confirmed that polymerization immediately began. Initially, the solution was clear but gradually became opaque, and when gel was formed in the reactor, agitation was stopped and polymerization vigorously occurred with foaming. It was confirmed that when foaming occurred, the volume expansion rate was 30 times or more of the initial volume of the injected monomer solution.

After 3 minutes had elapsed, foam gradually subsided and hydrogel polymer could be obtained. The polymer was cut to a size of 3×3 cm, and chopped using a Meat chopper to prepare a crumb. The crumb was dried in an oven in which wind volume may be transferred up and down. Hot air of 180° C. was flowed from the lower part to the upper part for 15 minutes and from the upper part to the lower part for 15 minutes to allow uniform drying, so that the moisture content of the dried product became 2% or less.

The dried product was pulverized with a pulverizer, and then, classified, and sizes of 150 to 850 μm were selected to prepare base resin. The prepared base resin had moisture retention capacity of 41.4 g/g, and water-soluble content of 15.3 wt %.

Example 1

A surface treatment solution was sprayed to the classified base resin BR-1 powder, and the base resin and the surface crosslinking solution were mixed. The polymer mixed with the crosslinking solution was fed to one surface crosslinking reactor, and the surface crosslinking reaction of hydrogel polymer was progressed at 185° C. for 40 minutes. Wherein, the surface treatment solution was prepared by adding 0.3 parts by weight of 1,3-propanediol, 0.5 parts by weight of ionic liquid (Chemical Formula 1([Bmin]Cl):R1=butyl, R2=methyl, 1-butyl-3-methylimidazolium chloride), and 0.03 parts by weight of Aerosil 200 to 3 parts by weight of water, based on 100 parts by weight of the BR-1

It was confirmed that even if lower alcohols are not added to the crosslinking solution, the base resin and the crosslinking solution are mixed well without agglomeration of large particles after the crosslinking solution is added.

After the surface crosslinking reaction, the product was classified using a standard sieve of ASTM standard to obtain superabsorbent polymer having a particle size of 150 μm to 850 μm.

Example 2

A surface treatment solution was sprayed to the classified base resin BR-2 powder, and the base resin and the surface crosslinking solution were mixed. The polymer mixed with the crosslinking solution was fed to one surface crosslinking reactor, and the surface crosslinking reaction of hydrogel polymer was progressed at 185° C. for 40 minutes. Wherein, the surface treatment solution was prepared by adding 0.5 parts by weight of 1,3-propanediol, 0.3 parts by weight of ionic liquid (Chemical Formula 1([Bmin]Cl):R1=butyl, R2=methyl, 1-butyl-3-methylimidazolium chloride), and 0.03 parts by weight of Aerosil 200 to 3 parts by weight of water, based on 100 parts by weight of the BR-1

It was confirmed that even if lower alcohols are not added to the crosslinking solution, the base resin and the crosslinking solution are mixed well without agglomeration of large particles after the crosslinking solution is added.

After the surface crosslinking reaction, the product was classified using a standard sieve of ASTM standard to obtain superabsorbent polymer having a particle size of 150 μm to 850 μm.

Example 3

Superabsorbent polymer was prepared by the same method as Example 1, except that 0.1 parts by weight of Aerosil 200 was added based on 100 parts by weight of BR-1 in the composition of the surface crosslinking solution.

Example 4

A surface treatment solution was sprayed to the classified base resin BR-2 powder, and the base resin and the surface crosslinking solution were mixed. The polymer mixed with the crosslinking solution was fed to one surface crosslinking reactor, and the surface crosslinking reaction of hydrogel polymer was progressed at 185° C. for 40 minutes. Wherein, the surface treatment solution was prepared by adding 0.5 parts by weight of 1,3-propanediol, 0.1 parts by weight of propyleneglycol, 0.2 parts by weight of ionic liquid (Chemical Formula 1([Bmin]Cl):R1=butyl, R2=methyl, 1-butyl-3-methylimidazolium chloride), and 0.1 parts by weight of Aerosil 200 to 3 parts by weight of water, based on 100 parts by weight of the BR-1

It was confirmed that even if lower alcohols are not added to the crosslinking solution, the base resin and the crosslinking solution are mixed well without agglomeration of large particles after the crosslinking solution is added.

After the surface crosslinking reaction, the product was classified using a standard sieve of ASTM standard to obtain superabsorbent polymer having a particle size of 150 μm to 850 μm.

Example 5

Superabsorbent polymer was prepared by the same method as Example 3, except that 0.25 parts by weight of aluminum sulfate was added based on 100 parts by weight of BR-2 in the composition of the surface crosslinking solution.

Comparative Example 1

Superabsorbent polymer was prepared by the same method as Example 1, except that the surface crosslinking was conducted without using the ionic liquid in the composition of the surface crosslinking solution.

It was confirmed that in case ionic liquid is not used, agglomeration of large particles occurs a lot, and the base resin and the crosslinking solution are not mixed well after the crosslinking solution is added.

Comparative Example 2

Superabsorbent polymer was prepared by the same method as Example 1, except that the ionic liquid was not used in the composition of the surface linking solution and that 3 parts by weight methanol was added based on the base resin. It was confirmed that in case methanol is used, although the ionic liquid is not used, the base resin and the crosslinking solution are mixed well without agglomeration of large particles after the crosslinking solution is added.

Experimental Example

For the superabsorbent polymers of Examples and Comparative Examples, the physical properties were measured as follows and the results are shown in the following Table 1.

<Measurement of Centrifuge Retention Capacity (CRC)>

For the superabsorbent polymers o Examples and Comparative Examples, centrifuge retention capacity (CRC) was measured.

Specifically, the polymers obtained in Examples and Comparative Examples were classified to 300~600 μm, W (g) (about 0.2 g) were uniformly put in an envelope made of non-woven fabrics and the envelope was sealed, and then, it was impregnated in a saline solution of 0.9 mass % at room temperature. After 30 minutes, the envelope was removed of moisture using a centrifuge at 250 G for 3 minutes, and then, the mass of the envelope W2 (g) was measured. And, the same operation was conducted without using polymer, and the mass W1 (g) was measured. Using obtained masses, CRC (g/g) was calculated according to the following Formula.

$$CRC(g/g)=\{(W2(g)-W1(g)-W(g))/W(g)\} \quad \text{[Formula 4]}$$

wherein,

W(g) is the weight (g) of the absorbent polymer,

W1(g) is the weight of the apparatus, which is measured after a non-woven fabric envelope without absorbent polymer is impregnated in 0.9 wt % of a saline solution at room temperature for 30 minutes, and then, dehydrated using a centrifuge at 250 G for 3 minutes.

W2(g) is the weight of the apparatus including absorbent polymer, which is measured after a non-woven fabric envelope including absorbent polymer is impregnated in 0.9 wt % of a saline solution at room temperature for 30 minutes, and then, dehydrated using a centrifuge at 250 g for 3 minutes.

<Measurement of Absorbency Under Load (AUL)>

For the superabsorbent polymers of Examples and Comparative Examples, absorbency under load (AUL) was measured (EDANA ERT 442).

The polymers obtained in Examples and Comparative Examples were classified to 300~600 μm, W (g) (about 0.16 g, A) were evenly sprayed to an AUL cylinder, and 0.9 psi pendulum was put, and then, the weight was measured (B). And, it was put on a Petri dish including 0.9 mass % of a saline solution, and swollen for 60 minutes. After 60 minutes, it was taken out and the weight was measured (C).

Using obtained masses, AUL (g/g) was calculated according to the following Formula.

$$AUL(g/g)=(C-B)\})/A$$

wherein,

A is the weight of absorbent polymer (g),

B is the weight of the AUL Kit assembly in which absorbent polymer is introduced, and C is the weight of the AUL Kit assembly after swollen in 0.9 wt % of a saline solution at room temperature for 60 minutes.

<Measurement of Gel Bed Permeability (GBP)>

For the superabsorbent polymers of Examples and Comparative Examples, gel bed permeability (GBP) was measured. It was measured according to the method described in U.S. Pat. No. 7,179,851.

It can be seen that Examples 1 to 5 of the present invention can control the absorption amount of water without agglomeration of gel by progressing surface crosslinking of hydrogel polymer with a surface treatment solution including ionic liquid, compared to Comparative Examples 1 to 2. Also, it can be seen from the Table 1 that in case ionic liquid is used, the physical properties of the product are excellent.

TABLE 1

|  | CRC (g/g) | AUL (g/g) | GBP (darcy) | Agglomeration during surface crosslinking |
|---|---|---|---|---|
| Example 1 | 33.5 | 22.2 | 10.8 | No |
| Example 2 | 33.6 | 23.6 | 12.3 | No |
| Example 3 | 33.3 | 20.1 | 18.2 | No |
| Example 4 | 32.8 | 22.8 | 19.6 | No |
| Example 5 | 34.1 | 19.5 | 22.1 | No |
| Comparative Example 1 | 36.1 | 9.4 | 0.6 | Yes |
| Comparative Example 2 | 32.4 | 20.7 | 5.3 | No |

Although the specific parts of the present invention have been described in detail, it would be obvious to one of ordinary knowledge in the art that these specific technologies are no more than preferable embodiments, and the scope of the invention is not limited thereto. Therefore, the substantial scope of the invention is defined by the attached claims and equivalents thereof.

The invention claimed is:

1. A method for preparing superabsorbent polymer, comprising:

thermally polymerizing or photopolymerizing a monomer composition comprising water-soluble ethylene unsaturated monomers and a polymerization initiator to form hydrogel polymer;

drying the hydrogel polymer;

pulverizing the dried hydrogel polymer to form a pulverized polymer; and spraying a surface crosslinking solution comprising a surface crosslinker, water and ionic liquid having a liquid state at 15 to 40° C. on to the pulverized polymer to crosslink the surface of the pulverized polymer, wherein:

the ionic liquid is used in the amount of 0.05 to 1.0 parts by weight, based on 100 parts by weight of the pulverized polymer, the crosslinking solution does not include a monohydric lower alcohol or further comprises monohydric lower alcohol of 0.1 to 2.0 parts by weight, based on 100 parts by weight of the pulverized polymer, the ionic liquid consists of cations and anions, and is neutral, the cation is selected from the group consisting of imidazole, pyridine, pyrazole, thiazole, isothiazole, azathiazole, oxothiazole, oxaine, oxazoline, oxazoborole, dithiozole, triazole, selenozole, oxaphosphole, pyrrole, borole, furan, thiophene, phosphole, pentazole, indole, indoline, oxazole, isoxazole, isotriazole, tetrazole, benzofuran, dibenzofuran, benzothiophene, dibenzothiophene, thiadiazole, pyrimidine, pyrazine, pyridazine, piperazine, piperidine, morpholene, pyrane, anoline, phthalazine, quinazoline, quinoxaline, quinoline, isoquinoline, tazine, oxazine, aza annulene, alkali metal, alkali earth metal, and transition metal cations, the anion is selected from the group consisting of anions constituting chloride salt, borate, nitrate, sulfate, triflate, halogenated copper salt, antimonite, carborane, polyoxometallate, metal borane, and carboxylate, and the surface crosslinker is at least one selected from the group consisting of a polyhydric alcohol compound, an epoxy compound, a polyamine compound, a haloepoxy compound, condensate of a haloepoxy compound, an oxazoline compound, a mono-, di-, or polyoxazolidinone compound, a cyclic urea compound, a multivalent metal salt, and an alkylene carbonate compound.

2. The method for preparing superabsorbent polymer according to claim 1, wherein the cation is selected from the group consisting of N-alkylpyridinium and N,N-dialkylimidazolium.

3. The method for preparing superabsorbent polymer according to claim 1, wherein the anion is selected from the group consisting of Cl$^-$, BF$_4^-$, PF$_6^-$, CF$_3$SO$_3^-$, CF$_3$COO$^-$, SbF$_6^-$, [CuCl$_2$]$^-$, SO$_4^-$, CF$_3$CH$_2$CH$_2$COO$^-$, (CF$_3$SO$_2$)C$^-$, CF$_3$(CF$_2$)$_3$SO$_3^-$, and [CF$_3$SO$_2$]$_2$N$^-$.

4. The method for preparing superabsorbent polymer according to claim 1, wherein the ionic liquid includes acidic ionic liquid prepared from a salt including cation of alkali metal or alkali earth metal, and anion of carboxylic acid bonded thereto.

5. The method for preparing superabsorbent polymer according to claim 1, wherein the surface crosslinker is added in the amount of 0.1 to 2.0 parts by weight, based on 100 parts by weight of the pulverized polymer.

6. The method for preparing superabsorbent polymer according to claim 1, wherein the moisture content of the thermally polymerized or photopolymerized hydrogel polymer is 40 to 80 wt %.

7. The method for preparing superabsorbent polymer according to claim 1, wherein the moisture content of the dried polymer is 0.1 to 10 wt %.

8. The method for preparing superabsorbent polymer according to claim 1, wherein the pulverization of the dried polymer is progressed such that the pulverized polymer has weight average particle diameter of 150 to 850 μm.

9. The method for preparing superabsorbent polymer according to claim 1, wherein the surface crosslinking is progressed at 100 to 250° C. for 1 to 120 minutes.

* * * * *